US011419068B2

(12) United States Patent
Gao et al.

(10) Patent No.: US 11,419,068 B2
(45) Date of Patent: Aug. 16, 2022

(54) LARGE-SCALE MIMO WIRELESS TRANSMISSION METHOD FOR MILLIMETER WAVE/TERAHERTZ NETWORKS

(71) Applicant: SOUTHEAST UNIVERSITY, Jiangsu (CN)

(72) Inventors: Xiqi Gao, Jiangsu (CN); Li You, Jiangsu (CN); Xu Chen, Jiangsu (CN); Yufei Huang, Jiangsu (CN); Xueyuan Shi, Jiangsu (CN); Siran He, Jiangsu (CN); Wenjin Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 17 days.

(21) Appl. No.: 17/256,656

(22) PCT Filed: Feb. 20, 2020

(86) PCT No.: PCT/CN2020/075931
§ 371 (c)(1),
(2) Date: Dec. 29, 2020

(87) PCT Pub. No.: WO2021/103325
PCT Pub. Date: Jun. 3, 2021

(65) Prior Publication Data
US 2021/0368455 A1    Nov. 25, 2021

(30) Foreign Application Priority Data
Nov. 28, 2019   (CN) .......................... 201911188554.8

(51) Int. Cl.
*H04W 52/42*   (2009.01)
*H04B 7/0452*  (2017.01)
(Continued)

(52) U.S. Cl.
CPC .......... *H04W 52/42* (2013.01); *H04B 7/0452* (2013.01); *H04W 56/005* (2013.01); *H04W 72/0473* (2013.01)

(58) Field of Classification Search
CPC ............... H04W 52/42; H04W 56/005; H04W 72/0473; H04W 52/267; H04B 7/0452;
(Continued)

(56) References Cited

U.S. PATENT DOCUMENTS

2003/0072379 A1 * 4/2003 Ketchum ................ H04L 5/006
                                                                  375/260
2003/0128658 A1 * 7/2003 Walton .................. H04L 5/0023
                                                                  370/208
(Continued)

FOREIGN PATENT DOCUMENTS

CN       105933979 A   * 9/2016
CN       108736939       11/2018
(Continued)

OTHER PUBLICATIONS

You Li, et al., "Key Technologies in Millimeter Wave Massive MIMO Wireless Transmission." ZTE Technology Journal, vol. 3, No. 23, Jun. 30, 2017, pp. 11-13.
(Continued)

*Primary Examiner* — Lana N Le
(74) *Attorney, Agent, or Firm* — JCIPRNET

(57) ABSTRACT

A large-scale MIMO (Multiple-Input Multiple-Output) wireless transmission method for millimeter wave/Terahertz networks is provided. In order to reduce the interruption of propagation in the millimeter wave/Terahertz band, a plurality of cells are combined into a wireless transmission network, the base station in each cell is equipped with a large-scale antenna array, and a unitary transformation matrix is used to achieve large-scale beam coverage for user
(Continued)

terminals in the entire network. Moreover, in order to reduce the influence of the multipath and Doppler effects on transmission performance, received signals are synchronized for time and frequency in each receiving beam of a user terminal. The method allocates power for signal transmission according to the statistic information of synchronized equivalent channels, and gives an optimal power allocation matrix by iterative solution based on the CCCP (concave-convex procedure) and the deterministic equivalent method.

7 Claims, 3 Drawing Sheets

(51) Int. Cl.
*H04W 56/00* (2009.01)
*H04W 72/04* (2009.01)

(58) Field of Classification Search
CPC .... H04B 7/0413; H04B 7/0617; H04B 7/043; H04B 7/0695; H04B 7/0626; H04B 7/0408; H04B 7/088; H04B 7/06; H04B 7/0426; H04B 17/382; H04B 7/0656; H04B 7/0897; H04B 17/309; H04L 5/0037; H04L 5/0023; Y02D 30/70
See application file for complete search history.

(56) References Cited

U.S. PATENT DOCUMENTS

| | | | |
|---|---|---|---|
| 2003/0161282 A1* | 8/2003 | Medvedev | H04L 5/0025 370/208 |
| 2017/0150510 A1* | 5/2017 | Islam | H04W 16/28 |
| 2017/0238294 A1* | 8/2017 | Lim | H04B 7/0695 370/277 |
| 2018/0084502 A1* | 3/2018 | Choi | H04B 7/0608 |
| 2018/0242325 A1* | 8/2018 | Guo | H04W 28/16 |
| 2018/0332541 A1* | 11/2018 | Liu | H04W 72/042 |
| 2019/0182093 A1* | 6/2019 | Jayawardene | H04B 7/088 |
| 2020/0205093 A1* | 6/2020 | Kim | H04W 52/242 |
| 2020/0228190 A1* | 7/2020 | Cirik | H04W 72/046 |
| 2021/0288715 A1* | 9/2021 | Gao | H04W 72/04 |

FOREIGN PATENT DOCUMENTS

| | | | | |
|---|---|---|---|---|
| CN | 110114982 | | 8/2019 | |
| WO | 2017000985 | | 1/2017 | |
| WO | WO-2018076362 A1 * | | 5/2018 | ............... H04B 7/01 |

OTHER PUBLICATIONS

"International Search Report (Form PCT/ISA/210)" of PCT/CN2020/075931, dated Jul. 29, 2020, pp. 1-4.

* cited by examiner

LARGE-SCALE MIMO WIRELESS TRANSMISSION METHOD FOR MILLIMETER WAVE/TERAHERTZ NETWORKS

CROSS-REFERENCE TO RELATED APPLICATION

This application is a 371 of international application of PCT application serial no. PCT/CN2020/075931, filed on Feb. 20, 2020, which claims the priority benefit of China application no. 201911188554.8, filed on Nov. 28, 2019. The entirety of each of the abovementioned patent applications is hereby incorporated by reference herein and made a part of this specification.

BACKGROUND

Technical Field

The present invention belongs to the field of communication, and specifically relates to a multi-cell wireless transmission method using large-scale antenna arrays working in the millimeter wave/Terahertz band, and particularly to a synchronization method applicable to this scenario and a power allocation method which is based on the synchronization method and utilizes statistical channel state information to perform beam-domain network transmission.

Description of Related Art

Base stations of a large-scale multiple-input multiple-output (MIMO) system use large-scale antenna arrays to simultaneously serve multiple users, thus effectively reducing inter-user interference and increasing the spectrum efficiency and power efficiency of the wireless communication system, which is considered as an important technology that may be adopted by the wireless communication system in the future. As another important technology, millimeter wave/Terahertz communication has also developed rapidly due to its advantages of wide bandwidth and narrow beam. Combining the large-scale MIMO with the millimeter wave/Terahertz communication is considered as a practical viewpoint, which is drawing increasing attention of people. On one hand, the wavelength in the millimeter wave/Terahertz band is short, so the base stations and user terminals can be equipped with large-scale arrays. On the other hand, the beamforming gain brought by the large-scale MIMO can effectively solve the problem of high path loss in the process of millimeter wave/Terahertz transmission.

While millimeter wave/Terahertz transmission adjusts carrier frequency into the millimeter wave/Terahertz band, the interruption of millimeter wave/Terahertz channels and the severe multipath and Doppler effects in the transmission process will cause the performance bottleneck of a wireless transmission system. In order to reduce the influence of channel interruption, a network transmission method can be adopted to combine multiple cells into a transmission network, and each base station can send signals to all user terminals in the network, breaking through the limitation of the conventional multi-cell transmission method that each base station can only communicate with user terminals in a cell. A central controller is equipped in the network. The central controller performs a joint design for transmitted signals of all the base stations according to acquired channel information. When the channel between a base station and a user terminal in a cell is interrupted, the other base stations in the network can communicate with the user to satisfy the communication demand of the user terminal. In order to reduce the severer multipath and Doppler effects in the process of millimeter wave/Terahertz transmission, it is necessary to explore a better synchronization method on the basis of conventional signal synchronization methods. In addition, the transmission performance of a system largely depends on the quality of channel information acquired by the base station side. It is difficult to acquire instantaneous channel information in a large-scale MIMO transmission system, particularly in the network transmission process, the huge overhead required to exchange instantaneous channel information between base stations and cells will severely affect system performance. Aimed at the aforementioned problems, the present invention proposes a large-scale MIMO wireless transmission method for millimeter wave/Terahertz networks, and particularly relates to a signal synchronization method applicable to this scenario and a power allocation method which is based on the synchronization method and utilizes statistical channel state information to perform beam-domain network wireless transmission.

SUMMARY

Objective

The objective of the present invention is to provide a large-scale MIMO wireless transmission method for networks working in the millimeter wave/Terahertz band to reduce the interruption and the multipath and Doppler effects in the transmission process.

Technical Solution

In order to achieve the aforementioned objective, the present invention adopts the following technical scheme:

a large-scale MIMO wireless transmission method for millimeter wave/Terahertz networks comprises:

(1) providing a large-scale antenna array for each base station in a wireless transmission network, wherein the base stations generate a large-scale beam set to cover the entire wireless transmission network using unitary transformation corresponding to the antenna arrays, and each base station in the wireless transmission network is in beam-domain wireless communication with each user terminal in the network in generated beams;

(2) each user terminal separately estimating time and frequency adjustment parameters in each beam based on received synchronizing signal sent from a base station;

(3) the user terminals separately synchronizing the received signals for time and frequency based on estimated time and frequency adjustment parameters in each receiving beam to effectively reduce the multipath and Doppler effects of the beam-domain signal subsequent to the synchronization, so that the signal is closer to the original beam-domain signal sent by the base station;

(4) the base stations in the wireless transmission network acquiring beam-domain statistical channel state information and sending the beam-domain statistical channel state information to a central controller in the network via backhaul links, wherein the central controller allocates power for beam-domain signal transmission based on the beam-domain statistical channel state information and sends a power allocation result to all the base stations via the backhaul links; and (5) the large-scale MIMO wireless transmission of the network dynamically changing when the beam-domain statistical channel state information of channels between the base stations and the user terminals in the wireless network changes.

In step (1), each of the base stations is equipped with a large-scale antenna array. Each base station in the wireless transmission network generates a large-scale beam using unitary transformation corresponding to its antenna array. A beam-domain unitary transformation matrix is uniquely determined for each base station, and does not change with user terminal position and channel state. Different from the conventional multi-cell transmission method that each base station can only communicate with user terminals in a cell, in order to reduce the channel interruption in the millimeter wave/Terahertz band, the method enables each base station to perform beam-domain wireless communication with all the user terminals in the wireless transmission network.

In step (2), for an individual user terminal, a minimum time offset of a signal in the receiving beam is estimated according to the beam-domain synchronizing signal sent by the base station, a target time compensation parameter is determined based on an estimated time offset of the signal transmitted to the receiving beam of the user terminal, and the minimum time offset in the receiving beam is adopted as the time compensation parameter. For an individual user terminal, a minimum frequency offset and a maximum frequency offset of a signal in the receiving beam are estimated according to the beam-domain synchronizing signal sent by the base station, a target frequency compensation parameter is determined based on estimated frequency offsets of the signal transmitted to the receiving beam of the user terminal, and the frequency compensation parameter is an average of the minimum frequency offset and the maximum frequency offset of the signal in the receiving beam.

In step (3), to maximize a system network transmission sum rate, the beam-domain statistical channel state information is used to design the power of signal transmission for each base station under a transmission power constraint of each base station. A beam-domain channel refers to an equivalent beam-domain channel which is acquired after a user terminal synchronizes time domain and frequency domain for a signal in each receiving beam. The characteristic that statistical channel state information is not associated with subcarriers can make a designed transmitted signal applicable to transmission on all the subcarriers, greatly decreasing the complexity of a transmission design.

In step (4), the system network transmission sum rate is a sum of traversal-achievable transmission rates of all the user terminals in the system; the transmission rate of each user terminal is expressed in the form of subtraction of two terms, wherein the first term is an expectation expression of entropy of a signal and interference plus noise received by the user terminal, and the second term is an expression of entropy of interference plus noise received by the user terminal; and the power is allocated based on the CCCP and the deterministic equivalent method to maximize the system network transmission sum rate.

The method for allocating the power allocation based on the CCCP and the deterministic equivalent method specifically comprises:

(a) calculating the deterministic equivalent expression of the first term of the transmission rate of each user terminal in the system transmission sum rate expression, wherein deterministic equivalent auxiliary variables in the deterministic equivalent expression are iteratively calculated based on the beam-domain statistical channel state information;

(b) calculating a derivative of the second term of the transmission rate of each user terminal in the system transmission sum rate expression with respect to a power allocation matrix to give a first-order Taylor expansion of the second term of the expression, wherein the Taylor series-expanded term is used to replace the second term of the transmission rate of each user terminal in the transmission sum rate expression, such that a convex optimization problem of power allocation is acquired;

(c) solving a fractional equation equivalent to the convex optimization problem acquired using a KKT condition to give a beam-domain power allocation matrix, wherein the Newton method or other methods for solving a fractional equation can be adopted to solve the fractional equation;

(d) using the acquired power allocation matrix to recalculate the deterministic equivalent expression of the first term and the Taylor series expansion of the second term in the system network transmission sum rate expression, such that an updated convex optimization problem is generated, and then solved; and iterative solution is performed until the system network transmission sum rate is converged, i.e., the difference between the system sum rates of two successive iteration result is less than a given threshold.

In step (5), with the change of millimeter wave/Terahertz channels and the movement of the user terminals in the transmission network, the statistical channel state information changes, and the base stations acquire statistical channel state information at corresponding time intervals according to different scenarios, and dynamically perform power allocation in the beam domain.

Advantages

Compared with the prior art, the present invention has the following advantages:

1. Compared with the existing conventional multi-cell transmission method, the present invention combines multiple cells into a network, so that base stations can communicate with all user terminals in the wireless transmission network. When the channel between a base station and a user terminal in the network is interrupted, the other base stations can communicate with the user terminal, which can guarantee the communication of the user terminal, thus increasing the communication performance of the entire transmission network.

2. As transmission performance is susceptible to time and frequency spread in the transmission process, signals of each receiving beam of a user terminal for receiving signals are synchronized for time and frequency in the present invention, effectively reducing time and frequency spread.

3. Transmission is designed by using statistical channel state information, the needed beam-domain statistical channel state information can be acquired through sparse detection signals, and the method is applicable to time division duplex and frequency division duplex systems. Moreover, because of the characteristic that statistical channel state information is not associated with subcarriers, the transmission design result is applicable to each subcarrier, effectively decreasing the complexity of a system transmission design.

4. An iterative power allocation algorithm based on CCCP and deterministic equivalent can effectively decrease the complexity of physical layer implementation, and can achieve approximately optimal transmission performance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to enable those skilled in the art to better understand the scheme of the present invention, the technical scheme in the example of the present invention will be clearly and fully described below with reference to the drawings in the embodiment of the present invention.

Figure 1:
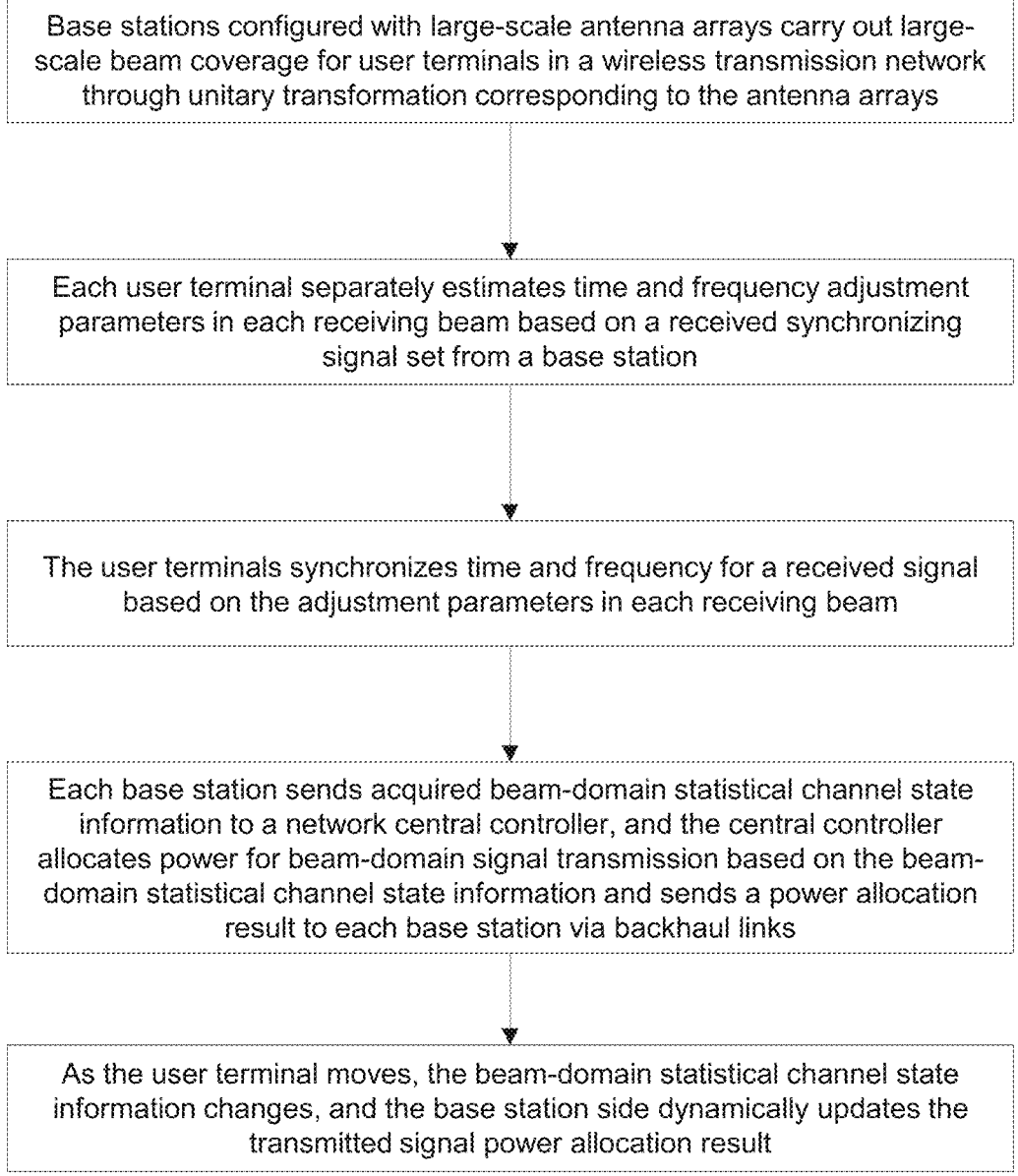
FIG. 1 is a flow chart of a large-scale MIMO wireless transmission method for millimeter wave/Terahertz networks.

As shown in FIG. 1, the example of the present invention discloses a large-scale MIMO wireless transmission method for millimeter wave/Terahertz networks, which mainly comprises:

(1) providing a large-scale antenna array for each base station in a wireless transmission network, wherein the base stations generate large-scale beams to cover the entire wireless transmission network using unitary transformation corresponding to the antenna arrays, differentiating user terminals at different positions and in different directions in the transmission network, and each base station communicating wirelessly with each user terminal in the wireless transmission network in a beam domain;

(2) separately synchronizing signals in each beam of a beam set of the user terminal; each user terminal separately estimating time and frequency adjustment parameters in each beam based on a received synchronizing signal sent from a base station;

(3) the user terminals separately synchronizing the received signals for time and frequency based on estimated time and frequency adjustment parameters in each receiving beam to effectively reduce the multipath and Doppler effects of the beam-domain signal subsequent to the synchronization, so that the signal is closer to the original beam-domain signal sent by the base station;

(4) the base stations in the wireless transmission network acquiring beam-domain statistical channel state information and sending the statistical channel state information to a central controller in the network via backhaul links, wherein the central controller allocates power for beam-domain signal transmission based on the beam-domain statistical channel state information and sends a power allocation result to all the base stations via the backhaul links; and (5) the large-scale MIMO wireless transmission of the network dynamically changing when the beam-domain statistical channel state information of channels between the base stations and the user terminals in the wireless network changes.

In a preferred embodiment, to maximize a system network transmission sum rate as a criterion, the central controller designs the transmitted signal power of each base station under a transmission power constraint of each base station using the beam-domain statistical channel state information. The system network transmission sum rate is a sum of traversal-achievable transmission rates of all the user terminals in the system; when designing an optimization problem, the transmission rate of each user terminal is expressed in the form of subtraction of two terms, wherein the first term is an expectation expression of entropy of a signal and interference plus noise received by the user terminal, and the second term is an expression of entropy of interference plus noise received by the user terminal; and the power is then allocated based on the CCCP and the deterministic equivalent method, which specifically comprises:

(a) calculating the deterministic equivalent expression of the first term of the transmission rate of each user terminal in the system transmission sum rate expression, wherein deterministic equivalent auxiliary variables in the deterministic equivalent expression are iteratively calculated based on the beam-domain statistical channel state information;

(b) calculating a derivative of the second term of the transmission rate of each user terminal in the system transmission sum rate expression with respect to a power allocation matrix to give a first-order Taylor expansion of the second term of the expression, wherein the Taylor series-expanded term is used to replace the second term of the transmission rate of each user terminal in the transmission sum rate expression, such that a convex optimization problem of power allocation is acquired;

(c) solving a fractional equation equivalent to the convex optimization problem acquired using a KKT condition to give a beam-domain power allocation matrix, wherein the Newton method or other methods for solving a fractional equation can be adopted to solve the fractional equation;

(d) using the acquired power allocation matrix to recalculate the deterministic equivalent expression of the first term and the Taylor series expansion of the second term in the system network transmission sum rate expression, such that an updated convex optimization problem is generated, and then solved; and iterative solution is performed until the system network transmission sum rate is converged, i.e., the difference between the system sum rates of two successive iteration result is less than a given threshold.

The specific steps of the example of the present invention are described below with reference to a specific scenario:

1. System Configuration

Figure 2:
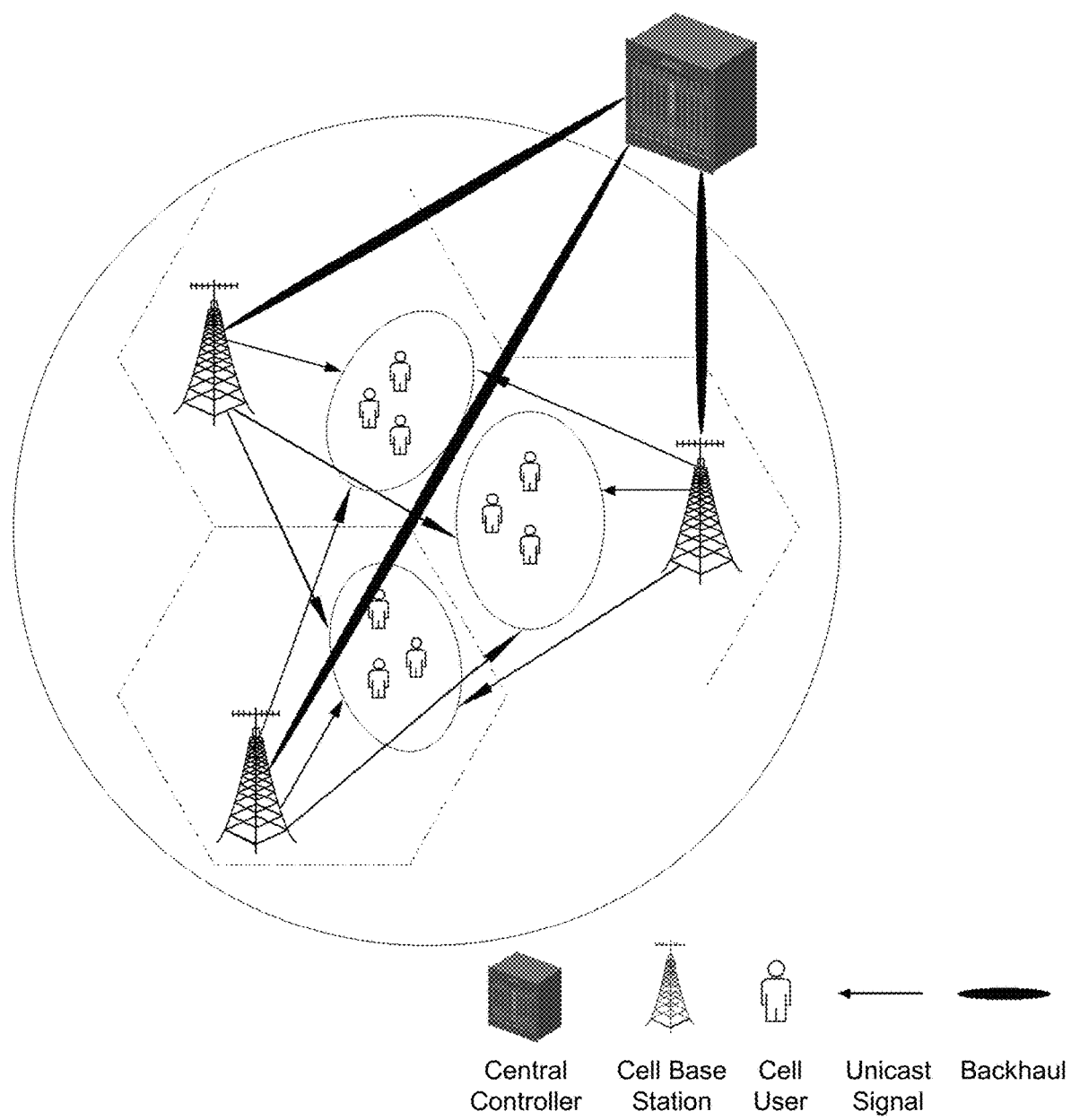
FIG. 2 is a schematic diagram of a large-scale MIMO wireless transmission system for millimeter wave/Terahertz networks.
Figure 3:
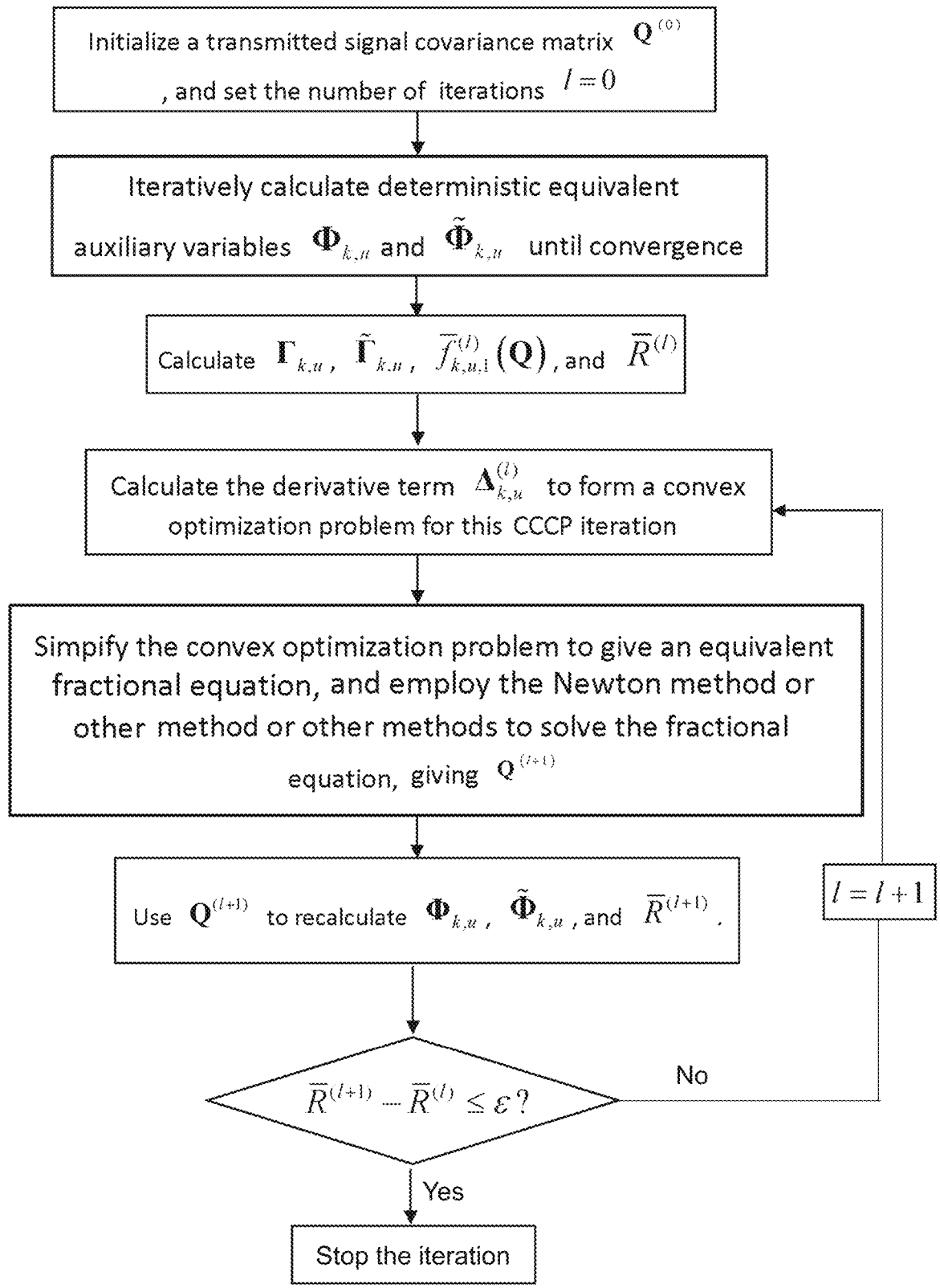
FIG. 3 is a flow chart of an iterative algorithm based on CCCP and deterministic equivalent.

Taking the large-scale MIMO wireless transmission system for millimeter wave/Terahertz networks shown in FIG. 2 as an example, the system is a network composed of U cells, each cell $u \in \{1, \ldots, U\}$ comprises a base station and $K_u$ user terminals, and the system comprises a network central controller. A $M_u = M_u^h \times M_u^v$ antenna uniform planar array is configured for the base station in the cell u, all the antenna element spacings of the uniform planar array in the horizontal direction and the vertical direction are of the half-wavelength order, wherein $M_u^h$ and $M_u^v$ denotes respectively antenna numbers in the horizontal dimension and vertical dimension of the planar array. A user terminal set $\{(k,u)|u=1, \ldots U, k=1, \ldots K_u\}$ in the network is defined, and a half-wavelength uniform linear array of $N_{k,u}$ antennas is configured for each user terminal (k,u). Different from the ordinary transmission method, each base station in the transmission network can communicate with each user terminal (k,u) in the network. The base stations generate large-scale beams through analog, digital or hybrid beamforming to cover the entire transmission network. In the present example, the antenna topologies of all the base stations are the same, so a unified unitary transformation matrix can be adopted to transform spatial-domain signals into beam domain, and the signals are transmitted to each user terminal in the beam domain. In the present example, a cyclic prefix-based orthogonal frequency division multiplexing (OFDM) broadband modulation method is adopted.

2. Beam-by-Beam Time-Frequency Synchronization $H_{k,u,v}(t,f)$ denotes a complex baseband downlink antenna domain channel response matrix from the base station to the user terminal (k,u) in the v th cell at time t and frequency f with the dimensionality denoted by $N_{k,u} \times M_v$, wherein $M_v$ denotes the antenna number of the base station (base station v) in the v th cell. The corresponding beam domain channel response matrix may be denoted by $\tilde{H}_{k,u,v}(t,f) = V_{k,u}^H H_{k,u,v}(t,f) V_v$, wherein $V_{k,u}$ and $U_v$ are respectively certainty matrices depending on the array topologies of the user terminal (k,u) side and the base station v side, i.e. beamforming matrices of the user terminal side and the base station side. When the aforementioned half-wavelength uniform planar array is configured for the base station side and a half-wavelength uniform linear array is configured for the user terminal side, $V_{k,u} = F_{N_{k,u}}$, and $U_v (F_{M_v^h} \otimes F_{M_v^v})$, wherein $F_M$ denotes a discrete Fourier transform (DFT) matrix of M×M, ⊗ denotes a Kronecker product of the matrix, and $M_v^h$ and $M_v^v$ denotes respectively antenna numbers in the horizontal dimension and vertical dimension of the planar array of the base station v.

Because frequency spread caused by multipath effect time spread and Doppler spread will affect the transmission performance of the OFDM system, it is necessary to synchronize the received signals for time and frequency. Different from an antenna-domain synchronization method adopting the same time-frequency synchronization parameters in different antenna, the received beam-domain signals are synchronized in each receiving beam of the user terminal in the method, thus reducing the multipath effect and Doppler spread of channels. The specific embodiment is as follows:

The base station side periodically sends a synchronizing signal; according to the synchronizing signal received by each beam, the user terminal can employ an existing estimation method (e.g. least square (LS) estimation) to give delay spread caused by the multipath effect and frequency spread caused by the Doppler effect; a minimum time offset, and a minimum frequency offset and a maximum frequency offset in the beam are then determined to give beam-domain time and frequency synchronization parameters; and a received signal is synchronized for time and frequency in each receiving beam. The minimum time offset in the i th beam of the user terminal (k,u) is $\tau_{k,u,i}^{min}$, and the minimum frequency offset and the maximum frequency offset are respectively $\upsilon_{k,u,i}^{min}$ and $\upsilon_{k,u,i}^{max}$. The time and frequency compensation parameters in the i th beam of the user terminal (k,u) are respectively $\tau_{k,u,i}^{syn} = \tau_{k,u,i}^{min}$, $\upsilon_{k,u,i}^{syn} = (\upsilon_{k,u,i}^{min} + \upsilon_{k,u,i}^{max})/2$. $y_{k,u,i}(t)$ denotes a received signal of the i th beam of the user terminal (k,u), and the time compensation of $\tau_{k,u,i}^{syn}$ and the frequency compensation of $\upsilon_{k,u,i}^{syn}$ are applied on $y_{k,u,i}(t)$. The compensated signal may be denoted by $$y_{k,u,i}^{PBS}(t) = y_{k,u,i}(t + \tau_{k,u,i}^{syn}) \exp\{-\emptyset 2\pi(t + \upsilon_{k,u,i}^{syn}) \upsilon_{k,u,i}^{syn}\}. \quad (1)$$

wherein exp{•} is an exponential operation with natural logarithm as a base, and Ø is an imaginary unit, i.e. $\emptyset = \sqrt{-1}$.

The received signal vector of the user terminal (k,u) subsequent to the time-frequency synchronization may be denoted by:

$$y_{k,u}^{PBS}(t) = [y_{k,u,0}^{PBS}(t), y_{k,u,2}^{PBS}(t), \ldots y_{k,u,N_{k,u}}^{PBS}(t)]^T. \quad (2)$$

wherein T denotes a transpose operation for the vector and the matrix. Through cyclic prefix removal, DFT and other operations, the demodulated signal of the user terminal (k,u) in the receiving beam i and the subcarrier s may be denoted by in digital domain:

$$y_{k,u,i,s} = \frac{1}{T_c} \int_0^{T_c} y_{k,u,i}^{PBS}(t) \exp\left\{-\emptyset 2\pi \frac{s}{T_c} t\right\} dt = \sum_{v=1}^{U} \sum_{j=0}^{M_v-1} [G_{k,u,v,s}]_{i,j} [x_{v,s}]_j \quad (3)$$

wherein $x_{v,s}$ is a signal sent by the base station v in the s th subcarrier, $T_c$ is OFDM symbol length, and $G_{k,u,v,s}$ is an equivalent beam-domain channel matrix from the base station v to the user terminal (k,u) in the subcarrier s subsequent to beam-by-beam time-frequency synchronization performed at the user terminal (k,u). In statistical channel state information $\Omega_{k,u,v,s} = \mathbb{E}\{G_{k,u,v,s} \odot G_{k,u,v,s}^*\}$ from the base station v to the user terminal (k,u) in the subcarrier s, ⊙ denotes a Hadamard product of the matrix. It is noted that the statistical channel state information is not associated with the subcarriers. The statistical channel state information in all the subcarriers is the same, so the subcarrier subscript s can be omitted, i.e. $\Omega_{k,u,v} = \Omega_{k,u,v,s}$.

3. Transmitted Signal Design

In this scenario, a beam-domain signal received by the user terminal (k,u) may be denoted by:

$$y_{k,u} = \sum_{v=1}^{U} G_{k,u,v} x_{k,u,v} + \sum_{v=1}^{U} \sum_{(i,j) \neq (k,u)} G_{k,u,v} x_{i,j,v} + n_{k,u} = \quad (4)$$

$$G_{k,u} x_{k,u} + \sum_{(i,j) \neq (k,u)} G_{k,u} x_{i,j} + n_{k,u},$$

For simplicity, all OFDM symbol numbers and subcarrier numbers in the aforementioned formula have been omitted. In the aforementioned formula, $x_{k,u,v}$ is a beam-domain signal vector (dimensionality: $M_v \times 1$) sent to the user terminal (k,u) by the base station v, $G_{k,u,v}$ is a beam-domain channel matrix from the base station v to the user terminal (k,u), $G_{k,u} = [G_{k,u,1}, G_{k,u,2}, \ldots, G_{k,u,U}]$ is a channel matrix (dimensionality:

$$N_{k,u} \times \left(\sum_{v=1}^{U} M_v\right)$$

rearranged from the beam-domain channel matrix, $x_{k,u} = [x_{k,u,1}^T, x_{k,u,2}^T, \ldots, x_{k,u,U}^T]$ is a vector (dimensionality:

$$\left(\sum_{v=1}^{U} M_v\right) \times 1$$

rearranged from beam-domain transmitted signals, and $n_{k,u}$ is white noise with zero mean variance of $\sigma^2$. In addition, beam-domain statistical channel state information is defined as $\Omega_{k,u} = \mathbb{E}\{G_{k,u} \odot G_{k,u}^*\}$.

It is assumed that the user terminal (k,u) regards interference plus noise $$\sum_{(i,j)\neq(k,u)} G_{k,u}x_{i,j} + n_{k,u}$$

as Gaussian noise, variance is $$K_{k,u} = \sigma^2 I_{N_{k,u}} + \sum_{(i,j)\neq(k,u)} E\{G_{k,u}Q_{i,j}G_{k,u}^H\},$$

wherein $I_{N_{k,u}}$ denotes a $N_{k,u} \times N_{k,u}$ unit matrix, $Q_{i,j} = E\{x_{i,j}x_{i,j}^H\}$ is a covariance matrix of a rearranged transmitted signal $x_{i,j}$, and the superscript H denotes the conjugate transpose of the matrix. For concise expression, Q is redefined, i.e.

$$Q \triangleq \{Q_{k,u}, \forall (k, u)\}.$$

The traversal-achievable transmission rate of the user terminal (k,u) may be denoted by:

$$R_{k,u} = E\{\log \det(K_{k,u} + G_{k,u}Q_{k,u}G_{k,u}^H)\} - \log \det(K_{k,u}) \quad (5)$$

Definition $$f_{k,u,1}(Q) = E\{\log \det(K_{k,u} + G_{k,u}+G_{k,u}Q_{k,u}G_{k,u}^H)\} \quad (6)$$

$$f_{k,u,2}(Q) = \log \det(K_{k,u}) \quad (7)$$

A system network transmission sum rate may be expressed as:

$$R = \sum_{u=1}^{U}\sum_{k=1}^{K_u} (f_{k,u,1}(Q) - f_{k,u,2}(Q)). \quad (8)$$

To maximize a system network transmission net sum rate, the transmission system designs a covariance matrix $Q_{k,u}$, $\forall(k,u)$ of beam-domain transmitted signals, so that optimal transmission performance can be easily achieved when the beam-domain transmitted signal covariance matrix $Q_{k,u}$, $\forall(k,u)$ is a diagonal matrix. The transmitted signal covariance matrix design problem is simplified as a power allocation problem, so the following optimization problem is acquired:

$$Q = \arg\max_{Q} \sum_{u=1}^{U}\sum_{k=1}^{K_u}(f_{k,u,1}(Q) - f_{k,u,2}(Q)) \quad (9)$$

s.t. $tr\sum_{u=1}^{U}\sum_{k=1}^{K_u}(E_v Q_{k,u}) \leq P_v, \forall_v$ $Q_{k,u} \succeq 0, \forall k$ wherein, for concise expression, Q is redefined, i.e.

$$Q \triangleq \{Q_{k,u}, \forall (k, u)\}.$$

$$E_v = \text{diag}\{0_{1\times\Sigma_{v'=1}^{v-1} M_{v'}}, 1_{1\times M_v}, 0_{1\times\Sigma_{v'=v+1}^{U} M_{v'}}\}$$

is a matrix of auxiliary base station power constraints, diag{•} denotes a vector diagonalization operation, $P_v$ is a power constraint of the base station v, tr(•) denotes the trace of the computing matrix, and $\succeq 0$ indicates that the matrix is nonnegative definite.

Because expected operation is involved in the calculation of a system network transmission sum rate, Monte Carlo simulation needs to be used to traverse channels. In order to decrease the complexity of the calculation, the large dimensional random matrix theory is used to calculate the deterministic equivalent of the traversal-achievable transmission rate of a user terminal in the present example. The method only needs to utilize statistical channel state information to acquire an approximate result of the system network transmission sum rate. In addition, the target function of this problem is not a convex function, so it is very difficult to give a global optimal solution and the complexity of solution is high. Therefore, a CCCP-based iterative algorithm is further adopted to solve the aforementioned optimization problem in the example of the present invention.

The specific embodiment of the algorithm is as follows:

Step 1: initializing a designed transmitted signal covariance matrix $Q^{(0)}$, and setting the number of iterations l=0. In the initialization of the transmitted signal covariance matrix $Q^{(0)}$, uniform power allocation or other power allocation methods can be assumed.

Step 2: using $Q^{(l)}$ to iteratively calculate deterministic equivalent auxiliary variables $\tilde{\Phi}_{k,u}$ and $\Phi_{k,u}$ used in the i th CCCP iteration until convergence.

$$\tilde{\Phi}_{k,u} = I_{N_{k,u}} + C_{k,u}((\Phi_{k,u})^{-1}Q_{k,u}^{(l)})K_{k,u}^{-1} \quad (10)$$

$$\Phi_{k,u} = I_{\Sigma_{v=1}^{U}M_v} + B_{k,u}((\tilde{\Phi}_{k,u})^{-1}K_{k,u}^{-})Q_{k,u}^{(l)} \quad (11)$$

The superscript −1 denotes a matrix inversion operation, $C_{k,u}(X)$ generates a diagonal matrix of $N_{k,u} \times N_{k,u}$, $B_{k,u}(Y)$ generates a diagonal matrix of $\Sigma_{v=1}^{U}M_v \times \Sigma_{v=1}^{U}M_v$, elements on the diagonal are denoted by:

$$[C_{k,u}(X)]_{n,n} = tr\{\text{diag}\{([\Omega_{k,u}]_{n,:})^T\}X\} \quad (12)$$

$$[B_{k,u}(Y)]_{m,m} = tr\{\text{diag}\{([\Omega_{k,u}]_{:,m})\}Y\} \quad (13)$$

wherein $[X]_{n,:}$ indicates that the n th row of the matrix X is taken, and $[X]_{:,m}$ indicates that the m th column of the matrix X is taken.

Step 3: using the deterministic equivalent auxiliary variables $\tilde{\Phi}_{k,u}$ and $\Phi_{k,u}$ to calculate $\Gamma_{k,u}$ and $\tilde{\Gamma}_{k,u}$ $$\Gamma_{k,u} = B_{k,u}((\tilde{\Phi}_{k,u})^{-1}K_{k,u}^{-1}) \quad (14)$$

$$\tilde{\Gamma}_{k,u} = C_{k,u}((\Phi_{k,u})^{-1}Q_{k,u}^{(l)}) \quad (15)$$

calculating the deterministic equivalent $\tilde{f}_{k,u,1}^{(l)}(Q)$ $$\tilde{f}_{k,u,1}^{(l)}(Q) = \log \det(I_{\Sigma_{v=1}^{U}M_v} + \Gamma_{k,u}Q_{k,u}^{(l)}) + \log \det(\tilde{\Gamma}_{k,u} + K_{k,u}) - tr(I_{N_{k,u}} - (\tilde{\Phi}_{k,u})^{-1}) \quad (16)$$

of the first term $f_{k,u,1}^{(l)}(Q)$ of the transmission rate of the user terminal for the l th CCCP iteration and calculating the deterministic equivalent of the system network transmission sum rate:

$$\bar{R}^{(l)} = \sum_{u=1}^{U}\sum_{k=1}^{K_u}(\tilde{f}_{k,u,1}(Q^{(l)}) - f_{k,u,2}(Q^{(l)})). \quad (17)$$

Step 4: calculating a derivative term $\Delta_{k,u}^{(l)}$ needed by the l th CCCP iteration as follows:

$$\Delta_{k,u}^{(l)} = \frac{\partial}{\partial Q_{k,u}} \sum_{i=1}^{U}\sum_{j=1}^{K_i} f_{k,u,2}(Q^{(l)}) = \sum_{(i,j)\neq(k,u)} \sum_{n=1}^{N_{i,j}} \frac{\hat{R}_{i,j,n}}{\sigma^2 + tr(Q_{\setminus(i,j)}^{(l)}\hat{R}_{i,j,n})} \quad (18)$$

wherein $$Q_{\setminus(i,j)}^{(l)} = \sum_{(p,q)\neq(i,j)} Q_{p,q}^{(l)}, \text{ and } \hat{R}_{i,j,n} = \text{diag}([\Omega_{i,j}]_{n,:});$$

thus forming a convex optimization problem for this CCCP iteration as follows:

$$Q^{(l+1)} = \arg\max_Q \sum_{u=1}^{U}\sum_{k=1}^{K_u} (\bar{f}_{k,u,1}(Q) - \tilde{f}_{k,u,2}(Q;Q^{(l)})) \quad (19)$$

$$\text{s.t. } tr\sum_{u=1}^{U}\sum_{k=1}^{K_u}(E_v Q_{k,u}) \leq P_v, \forall v$$

$$Q_{k,u} \succeq 0, \forall k$$

wherein $$\bar{f}_{k,u,1}(Q) = \log\det(I_{\sum_{v=1}^{U}M_v} + \Gamma_{k,u}Q_{k,u}) + \log\det(\tilde{\Gamma}_{k,u} + K_{k,u}) - tr(I_{N_{k,u}} - (\tilde{\Phi}_{k,u})^{-1}) \quad (20)$$

$$\tilde{f}_{k,u,2}(Q;Q^{(l)}) = f_{k,u,2}(Q^{(l)}) + tr((\Delta_{k,u}^{(l)})^T(Q_{k,u} - Q_{k,u}^{(l)})) \quad (21)$$

Step 5: further simplifying the optimization problem into $$Q^{(l+1)} = \arg\max_Q \sum_{u=1}^{U}\sum_{k=1}^{K_u} \left(\log\det\left(I_{\sum_{v=1}^{U}M_v} + \Gamma_{k,u}Q_{k,u}^{(l)}\right) + \log\det(\tilde{\Gamma}_{k,u} + K_{k,u}) - tr\left((\Delta_{k,u}^{(l)})^T Q_{k,u}\right)\right) \quad (22)$$

$$\text{s.t. } tr\sum_{u=1}^{U}\sum_{k=1}^{K_u}(E_v Q_{k,u}) \leq P_v, \forall v$$

$$Q_{k,u} \succeq 0, \forall k$$

acquiring a fractional equation equivalent to (22) according to a KKT condition of the optimization problem $$\begin{cases} \frac{\gamma_{k,u,m}^{(l)}}{1+\gamma_{k,u,m}^{(l)}\lambda_{k,u,m}^{(l+1)}} + \\ \sum_{(i,j)\neq(k,u)}\sum_{n=1}^{N_{i,j}} \frac{\hat{r}_{i,j,m,n}}{\tilde{\gamma}_{i,j,n}^{(l)} + \sigma^2 + tr(\hat{R}_{i,j,n}Q_{\setminus(i,j)}^{(l+1)})} = \delta_{k,u,m}^{(l)} + \upsilon_v, & \upsilon_v < \chi_{k,u,m}^{(l+1)} - \delta_{k,u,m}^{(l)} \\ \lambda_{k,u,m}^{(l+1)} = 0, & \upsilon_v \geq \chi_{k,u,m}^{(l+1)}\delta_{k,u,m}^{(l)} \end{cases} \quad (23)$$

and the Lagrange multiplier $\upsilon_v, \forall v$ meeting $$\upsilon_v\left(tr\left(\sum_{u=1}^{U}\sum_{k=1}^{K_u}(E_v Q_{k,u})\right) - P_v\right) = 0.$$

In formula (23), $\gamma_{k,u,m}$, $\lambda_{k,u,m}$, $\delta_{k,u,m}$, and $\hat{r}_{i,j,m,n}$ are respectively the m th diagonal elements of $\Gamma_{k,u}$, $Q_{k,u}$, $\Delta_{k,u}$, and $\hat{R}_{i,j,n}$, $\tilde{\gamma}_{i,j,n}$ is the n th diagonal element of $\tilde{\Gamma}_{i,j}$, and the auxiliary variable $\chi_{k,u,m}^{(l+1)}$ and the set $S_{k,u,m,i,j}$ are respectively $$\chi_{k,u,m}^{(l+1)} = \quad (24)$$

$$\gamma_{k,u,m}^{(l+1)} + \sum_{(i,j)\neq(k,u)}\sum_{n=1}^{N_{i,j}} \frac{\hat{r}_{i,j,m,n}}{\tilde{\gamma}_{i,j,n}^{(l+1)} + \sigma^2 + \sum_{(p,q,m')\in S_{k,u,m,i,j}} \hat{r}_{i,j,m',n}\lambda_{p,q,m'}^{(l+1)}}$$

$$S_{k,u,m,i,j} = \left\{(p,q,m') \mid (p,q) \neq (i,j), (p,q,m') \neq (k,u,m), m \in \left\{1, 2, \ldots, \sum_{v=1}^{U} M_v\right\}\right\} \quad (25)$$

The Newton method or other methods for solving a fractional equation can be adopted to solve the fractional equation (23).

Step 6: recalculating the deterministic equivalent auxiliary variables $\tilde{\Phi}_{k,u}$ and $\Phi_{k,u}$ of the system network transmission sum rate according to the solution of the fractional equation (23) until convergence, and calculating the deterministic equivalent $\overline{R}^{(l+1)}$ of a new system network transmission sum rate.

Step 7: comparing the deterministic equivalent $\overline{R}^{(l+1)}$ of the new system network transmission sum rate with the calculation result $\overline{R}^{(l)}$ of the previous iteration; if the difference between both is less than a given threshold ε, then stopping iteration, and $Q^{(l+1)}$ being a solution for the optimization problem; or else, l=l+1, and returning to step 4.

As the statistical channel state information is not associated with the subcarriers, the power allocation result is applicable to all the subcarriers, greatly decreasing the complexity of a transmitted signal design in the transmission process of the system.

As the user terminal moves, with the change of beam-domain statistical channel state information, the base station updates the transmitted signal power allocation result in real time. The change of beam-domain statistical channel state information is associated with a specific application scenario, and the typical statistic time window is several times or dozens of times a short-time transmission time window. The acquisition of related statistical channel state information is also carried out based on a large time width.

It should be pointed out that what is described above is merely the specific embodiments of the present invention. However, the protection scope of the present invention is not limited here, and all alterations or replacements which any of those familiar with the technical field may easily think of within the technical scope disclosed by the present invention shall fall within the protection scope of the present invention. All unspecified components in the present example can be implemented by using existing technologies.

What is claimed is:

1. A large-scale MIMO wireless transmission method for millimeter wave/Terahertz networks system, comprising:
    (1) providing a large-scale antenna array for each base station in a wireless transmission network, wherein the base stations generate a large-scale beam set to cover the entire wireless transmission network using unitary transformation corresponding to the antenna arrays, and each base station in the wireless transmission network is in beam-domain wireless communication with each user terminal in the network in generated beams;

(2) each user terminal separately estimating time and frequency adjustment parameters in each beam based on a received synchronizing signal sent from a base station;

(3) the user terminals separately synchronizing the received signals for time and frequency based on estimated time and frequency adjustment parameters in each receiving beam;

(4) each base station in the network sending acquired beam-domain statistical channel state information to a network central controller, wherein the central controller allocates power for beam-domain signal transmission based on the beam-domain statistical channel state information and sends a power allocation result to each base station via a backhaul link, wherein, to maximize a system network transmission sum rate, the central controller designs the power of signal transmission for each base station under a transmission power constraint of each base station using the beam-domain statistical channel state information, wherein the transmitted signal power allocation result is applied to all subcarriers, wherein the system network transmission sum rate is a sum of traversal-achievable transmission rates of all the user terminals in the system; the transmission rate of each user terminal is expressed in the form of subtraction of two terms, wherein the first term is an expectation expression of entropy of a signal and interference plus noise received by the user terminal, and the second term is an expression of entropy of interference plus noise received by the user terminal; and the power is allocated based on the CCCP and the deterministic equivalent method to maximize the system network transmission sum rate, wherein a user terminal set $\{(k,u)|i=1, \ldots, U, k=1, \ldots K_u\}$ in the network is defined, wherein the system is a network composed of U cells, wherein each cell $u \in \{1, \ldots, U\}$ comprises a base station and $K_u$ user terminals, wherein the traversal-achievable transmission rate of the user terminal (k,u) may be denoted by $R_{k,u}=E\{\log \det(K_{k,u}+G_{k,u}Q_{k,u}G_{k,u}^H)\}-\log \det(K_{k,u})$, wherein $$K_{k,u} = \sigma^2 I_{N_{k,u}} + \sum_{(i,j) \neq (k,u)} E\{G_{k,u}Q_{i,j}G_{k,u}^H\},$$

wherein $G_{k,u}=[G_{k,u,1}, G_{k,u,2}, \ldots, G_{k,u,U}]$ is a channel matrix (dimensionality:

$$N_{k,u} \times \left(\sum_{v=1}^{U} M_v\right))$$

rearranged from the beam-domain channel matrix, wherein $G_{k,u,v}$ is a beam-domain channel matrix from the base station v to the user terminal (k,u), wherein $M_v$ denotes the antenna number of the base station(base station v) in the vth cell, wherein $I_{N_{k,u}}$ denotes a $N_{k,u} \times N_{k,u}$ unit matrix, wherein a half-wavelength uniform linear array of $N_{k,u}$ antennas is configured for each user terminal (k,u), wherein $x_{k,u}=[x_{k,u,1}^T, x_{k,u,2}^T, \ldots, x_{k,u,U}^T]^T$ is a vector (dimensionality:

$$\left(\sum_{v=1}^{U} M_v\right) \times 1)$$

rearranged from beam-domain transmitted signals, wherein $x_{k,u,v}$ is a beam-domain signal vector (dimensionality: $M_v \times 1$) sent to the user terminal (k,u) by the base station v, wherein $Q_{i,j}=E\{x_{i,j}x_{i,j}^H\}$ is a covariance matrix of a rearranged transmitted signal $x_{i,j}$;

(5) the large-scale MIMO wireless transmission of the network dynamically changing when the beam-domain statistical channel state information of channels between the base stations and the user terminals in the wireless network changes.

2. The large-scale MIMO wireless transmission method for millimeter wave/Terahertz networks according to claim 1, wherein, in step (1), each of the base stations is equipped with a large-scale antenna array, the base stations in the wireless transmission network generate large-scale beams using unitary transformation corresponding to the antenna arrays, and a beam-domain unitary transformation matrix is uniquely determined for each base station, and does not change with user terminal position and channel state.

3. The large-scale MIMO wireless transmission method for millimeter wave/Terahertz networks according to claim 2, wherein millimeter wave/Terahertz beams with the same preset frequency are adopted as the large-scale beams.

4. The large-scale MIMO wireless transmission method for millimeter wave/Terahertz networks according to claim 1, wherein, in step (2), for an individual user terminal, a minimum time offset of a signal in the receiving beam is estimated according to the beam-domain synchronizing signal sent by the base station, a target time compensation parameter is determined based on an estimated time offset of the signal transmitted to the receiving beam of the user terminal, and the minimum signal time offset in the receiving beam is adopted as the time compensation parameter.

5. The large-scale MIMO wireless transmission method for millimeter wave/Terahertz networks according to claim 1, wherein, in step (2), for an individual user terminal, a minimum frequency offset and a maximum frequency offset of a signal in the receiving beam are estimated according to the beam-domain synchronizing signal sent by the base station, a target frequency compensation parameter is determined based on estimated frequency offsets of the signal transmitted to the receiving beam of the user terminal, and the frequency compensation parameter is an average of the minimum frequency offset and maximum frequency offset of the signal in the receiving beam.

6. The large-scale MIMO wireless transmission method for millimeter wave/Terahertz networks according to claim 1, wherein the method for allocating the power based on the CCCP and the deterministic equivalent method comprises:

(a) calculating the deterministic equivalent expression of the first term for the transmission rate of each user terminal in the system network transmission sum rate expression, wherein deterministic equivalent auxiliary variables in the deterministic equivalent expression are iteratively calculated based on the beam-domain statistical channel state information;

(b) calculating a derivative of the second term of the transmission rate of each user terminal in the system network transmission sum rate expression with respect to a power allocation matrix to give a first-order Taylor expansion of the second term of the expression, wherein the Taylor series-expanded term is used to replace the second term of the transmission rate of each user terminal in the transmission sum rate expression, such that a convex optimization problem of power allocation is acquired;

(c) solving a fractional equation equivalent to the convex optimization problem acquired using a KKT condition to give a beam-domain power allocation matrix; and (d) using the acquired power allocation matrix to recalculate the deterministic equivalent expression of the first term and the Taylor series expansion of the second term in the system transmission sum rate expression, such that an updated convex optimization problem is generated, and then solved; and iterative solution is performed until the system transmission sum rate is converged, i.e., the difference between the system sum rates of two successive iteration result is less than a given threshold.

7. The large-scale MIMO wireless transmission method for millimeter wave/Terahertz networks according to claim 1, wherein, in step (5), with the change of millimeter wave/Terahertz channels and the movement of the user terminals in the transmission network, the statistical channel state information changes, and the base stations acquire statistical channel state information at corresponding time intervals according to different scenarios, and dynamically perform power allocation in the beam domain.

\* \* \* \* \*